US012418750B2

(12) United States Patent
Huang

(10) Patent No.: US 12,418,750 B2
(45) Date of Patent: Sep. 16, 2025

(54) LOUDSPEAKER, AND MANUFACTURING METHOD AND SOUND PRODUCTION METHOD THEREFOR

(71) Applicant: TANG BAND INDUSTRIES CO., LTD., Zhejiang (CN)

(72) Inventor: Hsin Min Huang, Ningbo (CN)

( * ) Notice: Subject to any disclaimer, the term of this patent is extended or adjusted under 35 U.S.C. 154(b) by 20 days.

(21) Appl. No.: 17/639,313

(22) PCT Filed: Aug. 31, 2020

(86) PCT No.: PCT/CN2020/112490

§ 371 (c)(1),
(2) Date: Feb. 28, 2022

(87) PCT Pub. No.: WO2021/037259

PCT Pub. Date: Mar. 4, 2021

(65) Prior Publication Data

US 2022/0322012 A1 Oct. 6, 2022

(30) Foreign Application Priority Data

Aug. 30, 2019 (CN) ......................... 201910815185.4

(51) Int. Cl.
*H04R 9/06* (2006.01)
*H04R 7/16* (2006.01)
(Continued)

(52) U.S. Cl.
CPC ................. *H04R 9/06* (2013.01); *H04R 7/16* (2013.01); *H04R 7/20* (2013.01); *H04R 9/025* (2013.01);
(Continued)

(58) Field of Classification Search
CPC . H04R 7/127; H04R 7/16; H04R 7/20; H04R 9/025; H04R 9/043; H04R 9/06;
(Continued)

(56) References Cited

U.S. PATENT DOCUMENTS 6,031,925 A * 2/2000 Shteyn .................. H04R 9/063 381/403
6,636,612 B1 10/2003 North et al.
(Continued)

FOREIGN PATENT DOCUMENTS

CN 203378037 U 1/2014
CN 107404693 A 11/2017

*Primary Examiner* — Huyen D Le
(74) *Attorney, Agent, or Firm* — Tsz Lung Yeung

(57) ABSTRACT

The present invention discloses a loudspeaker, and a manufacturing method and a sound production method therefor. The loudspeaker includes a vibrating diaphragm, a frame, a magnetic loop system, a voice coil, a suspension edge, a connecting member and a limiting part, wherein the magnetic loop system is arranged on the frame. A lower end of the voice coil is coupled to the magnetic loop system. A suspension edge outer side and a suspension edge inner side of the suspension edge extend and are respectively connected to the frame and the vibrating diaphragm, so as to allow the suspension edge to be maintained between the frame and the vibrating diaphragm. The connecting member is configured to connect to the vibrating diaphragm and the voice coil. A limiting outer side and a limiting inner side of the limiting part extend and are respectively connected to the frame and the connecting member, so as to allow the limiting part to be maintained between the frame and the connecting member.

11 Claims, 8 Drawing Sheets

(51) Int. Cl.

| | |
|---|---|
| ***H04R 7/20*** | (2006.01) |
| ***H04R 9/02*** | (2006.01) |
| ***H04R 9/04*** | (2006.01) |
| ***H04R 31/00*** | (2006.01) |

(52) U.S. Cl.
CPC ........... *H04R 9/043* (2013.01); *H04R 31/003* (2013.01); *H04R 2207/021* (2013.01); *H04R 2400/11* (2013.01)

(58) Field of Classification Search
CPC .................. H04R 31/00; H04R 31/003; H04R 2207/021; H04R 2231/003; H04R 2400/11
See application file for complete search history.

(56) References Cited

U.S. PATENT DOCUMENTS

| | | | | |
|---|---|---|---|---|
| 8,249,290 | B2 * | 8/2012 | Funahashi | H04R 9/06 381/403 |
| 2002/0071592 | A1 * | 6/2002 | Proni | H04R 9/06 381/423 |
| 2005/0201588 | A1 * | 9/2005 | Funahashi | H04R 7/26 381/423 |
| 2009/0022355 | A1 * | 1/2009 | Funahashi | H04R 9/043 381/403 |

* cited by examiner

LOUDSPEAKER, AND MANUFACTURING METHOD AND SOUND PRODUCTION METHOD THEREFOR

BACKGROUND OF THE PRESENT INVENTION

Field of Invention

The present invention relates to the field of sound, and more particularly to a loudspeaker, and manufacturing method and sound production method thereof.

Description of Related Arts

A loudspeaker is a transducer that can convert audio signals into sound waves. A conventional loudspeaker comprises an upper frame, a lower frame, a vibrating diaphragm, a suspension, a spider, a voice coil, and a magnetic loop system. A middle part of the upper frame has a perforation to make the upper frame be ring-shaped, the outer and inner sides of the suspension edge are respectively extended to be connected to the upper frame and the vibrating diaphragm to hold the vibrating diaphragm in the perforation of the upper frame. The magnetic loop system is mounted to the lower frame, a lower end of the voice coil and the magnetic loop system are magnetically communicatively coupled with each other, the outer and inner sides of the spider are respectively extended to be connected to the lower frame and the voice coil, the upper The frame and the lower frame are mounted to each other, and an upper end of the voice coil is connected to the vibrating diaphragm. When the audio signal is input, based on the principle of electromagnetic induction, the magnetic loop system can induce the voice coil to reciprocate along the central axis of the loudspeaker, so as to allow the voice coil to drive the vibrating diaphragm to synchronously reciprocate along the central axis of the loudspeaker to agitate air to generate sound waves, when the loudspeaker is driven to produce the reciprocating movement, the suspension is used to limit the stroke of the vibrating diaphragm and restrict the reciprocating movement of the vibrating diaphragm to be along the central axis of the loudspeaker to prevent the vibrating diaphragm from deviating from the central axis. At the same time, the spider is used to restrict the reciprocating movement of the voice coil to be along the central axis of the loudspeaker to prevent the voice coil from deviating from the central axis.

However, since the spider and the vibrating diaphragm of the loudspeaker are separate structures, and they are usually made of different materials, the elasticity of the spider and the elasticity of the vibrating diaphragm are different, especially the elasticity of the vibrating diaphragm is greater than the elasticity of the spider. The difference in elasticity between the vibrating diaphragm and the spider results in uneven moving speed of the vibrating diaphragm when it is driven by the voice coil to reciprocate. In addition, when the voice coil is induced by the magnetic loop system to reciprocate, the spider will produce a pulling force on the voice coil. For example, when the magnetic loop system induces the voice coil to move upward, the spider will exert a downward pulling force on the voice coil, which requires the magnetic loop system to provide a relatively large magnetic force which is sufficient to overcome the downward pulling force applied on the voice coil by the spider, so as to ensure the stroke of the vibrating diaphragm.

SUMMARY OF THE PRESENT INVENTION

The invention is advantageous in that it provides a loudspeaker, and manufacturing method and sound production method thereof, wherein a thickness of the loudspeaker can be effectively reduced, so that the loudspeaker tends to be flat.

Another advantage of the invention is to provide a loudspeaker, and manufacturing method and sound production method thereof, wherein the loudspeaker does not need to arrange a spider around the voice coil, so that it can not only make the structure of the loudspeaker be more compact, but also effectively reduce the thickness of the loudspeaker.

Another advantage of the invention is to provide a loudspeaker, and manufacturing method and sound production method thereof, wherein the loudspeaker provides a suspension edge and a limiting part, wherein the suspension edge is arranged to surround the vibrating diaphragm of the loudspeaker, and the limiting part is arranged to surround the voice coil, wherein the suspension edge and the limiting part can cooperate with each other to ensure that the vibrating diaphragm and the voice coil reciprocate along the central axis of the loudspeaker respectively.

Another advantage of the invention is to provide a loudspeaker, and manufacturing method and sound production method thereof, wherein the suspending edge and the limiting part are made of the same material, for example, both the suspending edge and the limiting part can be made of rubber materials, so that the elasticity of the suspending edge and the limiting part are the same, so that when the vibrating diaphragm is driven by the voice coil to reciprocate along the central axis of the loudspeaker, the moving speed of the vibrating diaphragm is even to ensure the sound quality of the loudspeaker.

Another advantage of the invention is to provide a loudspeaker, and manufacturing method and sound production method thereof, wherein the loudspeaker provides a connecting member including a first connecting arm and a second connecting arm, wherein the first connecting arm is provided to connect the vibrating diaphragm and the voice coil, so as to allow the voice coil to drive the vibrating diaphragm to reciprocate along the central axis of the loudspeaker while the voice coil is induced by the magnetic loop system, wherein the second connecting arm is provided to connect the vibrating diaphragm and the limiting part to allow the limiting part to surround the voice coil.

Another advantage of the invention is to provide a loudspeaker, and manufacturing method and sound production method thereof, wherein the first connecting arm and the second connecting arm of the connecting member have an integral structure, so that the first connecting arm and the second connecting arm are connected to the vibrating diaphragm at a same position of the vibrating diaphragm.

Another advantage of the invention is to provide a loudspeaker, and manufacturing method and sound production method thereof, wherein the first connecting arm has a straight arm portion, and the straight arm portion of the first connecting arm is connected to the voice coil, so that when the magnetic loop system induces the voice coil to reciprocate along the central axis of the loudspeaker in response to the input of an audio signal, the phenomenon of mutual interference between the first connecting arm and the magnetic loop system can be avoided, so as to avoid a noise during the sound production process of the loudspeaker, and to ensure the medium and low frequency sound effects of the loudspeaker by ensuring a stroke of the vibrating diaphragm.

Another advantage of the invention is to provide a loudspeaker, and manufacturing method and sound production method thereof, wherein the vibrating diaphragm is directly connected to the suspension edge, so that the suspension edge can directly drive the vibrating diaphragm to reciprocate along the central axis of the loudspeaker with the driving of the magnetic loop system, wherein the connecting member is arranged to connect the vibrating diaphragm and the limiting part, so as to ensure the suspension edge and the limiting part to deform synchronously with a same amplitude, so as to ensure the sound effect of the loudspeaker.

According to one aspect of the present invention, the present invention provides a loudspeaker comprising:

a vibrating diaphragm;

a frame;

a connecting member;

a magnetic loop system, wherein the magnetic loop system is provided on the frame;

a voice coil, wherein the voice coil is coupled to the magnetic loop system, wherein the vibrating diaphragm is provided to be capable of being driven to move by the voice coil;

a suspension edge, wherein two opposite sides of the suspension edge are respectively connected to the frame and the vibrating diaphragm; and a limiting part, wherein the limiting part has a limiting outer side and a limiting inner side opposite to the limiting outer side, the limiting outer side of the limiting part is installed to the frame, and limiting inner side is extended toward the voice coil, wherein the connecting member is provided to connect the vibrating diaphragm with the limiting inner side of the limiting part.

According to an embodiment of the present invention, the connecting member comprises a first connecting arm and a second connecting arm, wherein two end portions of the first connecting arm are respectively connected to the vibrating diaphragm and the voice coil, so that the vibrating diaphragm is capable of being driven by the voice coil, wherein two end portions of the second connecting arm are respectively connected to the vibrating diaphragm and the limiting inner side of the limiting part.

According to an embodiment of the present invention, the vibrating diaphragm is connected to the voice coil, so that the vibrating diaphragm is capable of being driven by the voice coil.

According to an embodiment of the present invention, the suspension edge and the limiting part are made of a same material.

According to an embodiment of the present invention, the first connecting arm and the second connecting arm are connected to a same position of the vibrating diaphragm.

According to an embodiment of the present invention, the first connecting arm is connected to the vibrating diaphragm on an inner side of the vibrating diaphragm, wherein the second connecting arm is connected to the vibrating diaphragm on an outer side of the vibrating diaphragm.

According to an embodiment of the present invention, the first connecting arm and the second connecting arm have an integral structure.

According to an embodiment of the present invention, the first connecting arm portion has an deviation arm portion and a straight arm portion, wherein the deviation arm portion is extended from the vibrating diaphragm to the voice coil, wherein the straight arm portion is connected to the voice coil.

According to an embodiment of the present invention, a cross-sectional edge line of the deviation arm portion is a curve or a straight line, wherein the straight arm portion is attached to the voice coil.

According to an embodiment of the present invention, a cross-sectional shape of the connecting member is "U" shape or "V" shape.

According to an embodiment of the present invention, the vibrating diaphragm is inclinedly and downwardly extended downward the suspension edge to the voice coil.

According to an embodiment of the present invention, the vibrating diaphragm is inclinedly and upwardly extended from the suspension edge to the voice coil.

According to an embodiment of the present invention, the suspension edge is arranged between the frame and the vibrating diaphragm in a manner of protruding outward, wherein the limiting part is arranged between the frame and the connecting member in a manner of protruding outward, wherein protruding directions of the suspension edge and the limiting part are opposite.

According to another aspect of the present invention, the present invention provides a manufacturing method for manufacturing a loudspeaker, wherein the method comprises the following steps:

(a) allowing a suspension edge outer side and a suspension edge inner side of a suspension edge be respectively connected to an upper frame and a vibrating diaphragm;

(b) connecting a connecting member to a limiting inner side of a limiting part and the vibrating diaphragm;

(c) installing a magnetic loop system to a lower frame; and (d) installing a limiting outer side of the limiting part to the lower frame in such a manner that a lower end portion of a voice coil for driving the vibrating diaphragm is coupled to the magnetic loop system, and mounting the upper frame with the lower frame, so as to obtain the loudspeaker.

According to an embodiment of the present invention, in the above method, a higher end portion of the voice coil is connected to the vibrating diaphragm, so as to allow the voice coil to drive the vibrating diaphragm.

According to an embodiment of the present invention, in the above method the connecting member is connected to the voice coil, so as to allow the voice coil to drive the vibrating diaphragm through the connecting member.

According to an embodiment of the present invention, the step (b) comprises the following steps:

bonding a middle portion of the connecting member to the vibrating diaphragm; and respectively bonding two end portions of the connecting member to the voice coil and the limiting inner side of the limiting part.

According to an embodiment of the present invention, the step (b) comprises the following steps:

integrally forming the connecting member on the vibrating diaphragm in such a manner that the middle portion of the connecting member is connected to the vibrating diaphragm; and respectively bonding two end portions of the connecting member to the voice coil and the limiting inner side of the limiting part.

According to an embodiment of the present invention, in the above method, two end portions of the connecting member are respectively bonded to the voice coil and the limiting inner side of the limiting part.

According to another aspect of the present invention, the present invention provides a sound production method of a loudspeaker, wherein the method comprises the following steps:

(A) driving a voice coil to reciprocate along a central axis of the loudspeaker when a magnetic loop system is responsive to an input of an audio signal; and (B) when the voice coil drives a vibrating diaphragm to reciprocate synchronously along the central axis of the loudspeaker, driving a suspension edge to move and driving a limiting part to move with the help of a connecting member by the vibrating diaphragm, so as to allow the suspension edge and the limiting part to reciprocate along the central axis of the loudspeaker synchronously with a same amplitude.

According to an embodiment of the present invention, in the step (B), the voice coil directly drives the vibrating diaphragm to reciprocate synchronously along the central axis of the loudspeaker.

According to an embodiment of the present invention, in in step (B), the voice coil drives the vibrating diaphragm to reciprocate synchronously along the central axis of the loudspeaker with the help of the connecting member.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

It should be understood that the term "a" should be understood as "at least one" or "one or more". In other words, in one embodiment, the number of an element may be one, and in another embodiment, the number of the element may be plural. The term "one" should not be understood as a limitation on the number.

Figure 1:
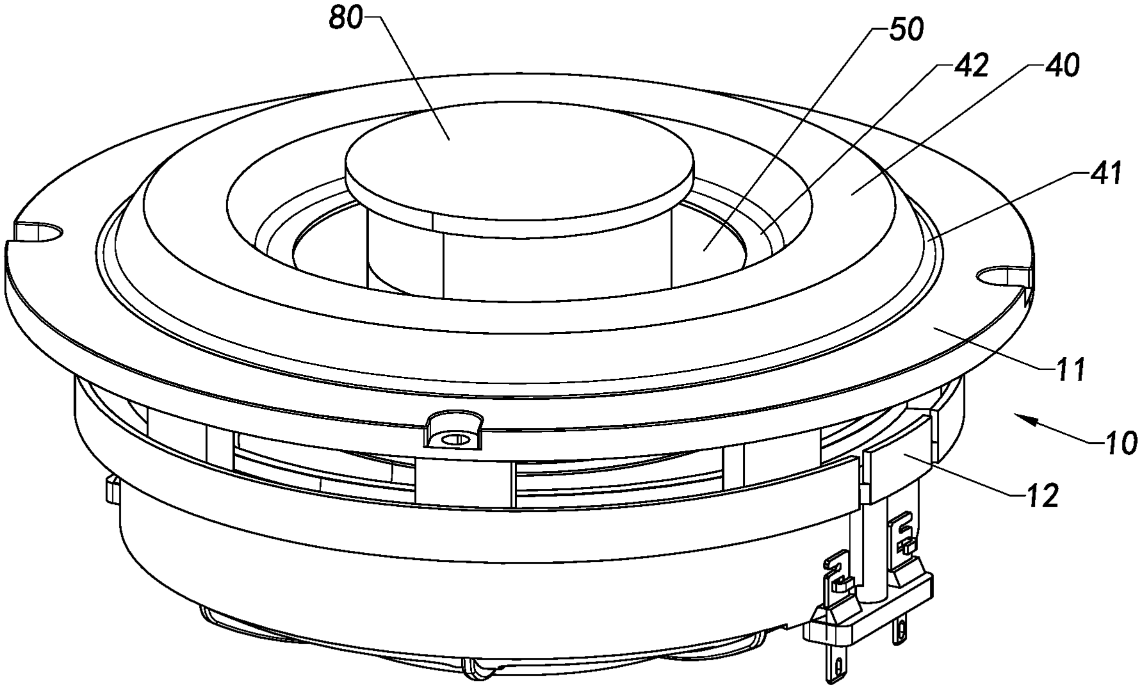
FIG. 1 is a perspective view of a loudspeaker according to a preferred embodiment of the present invention.
Figure 2:
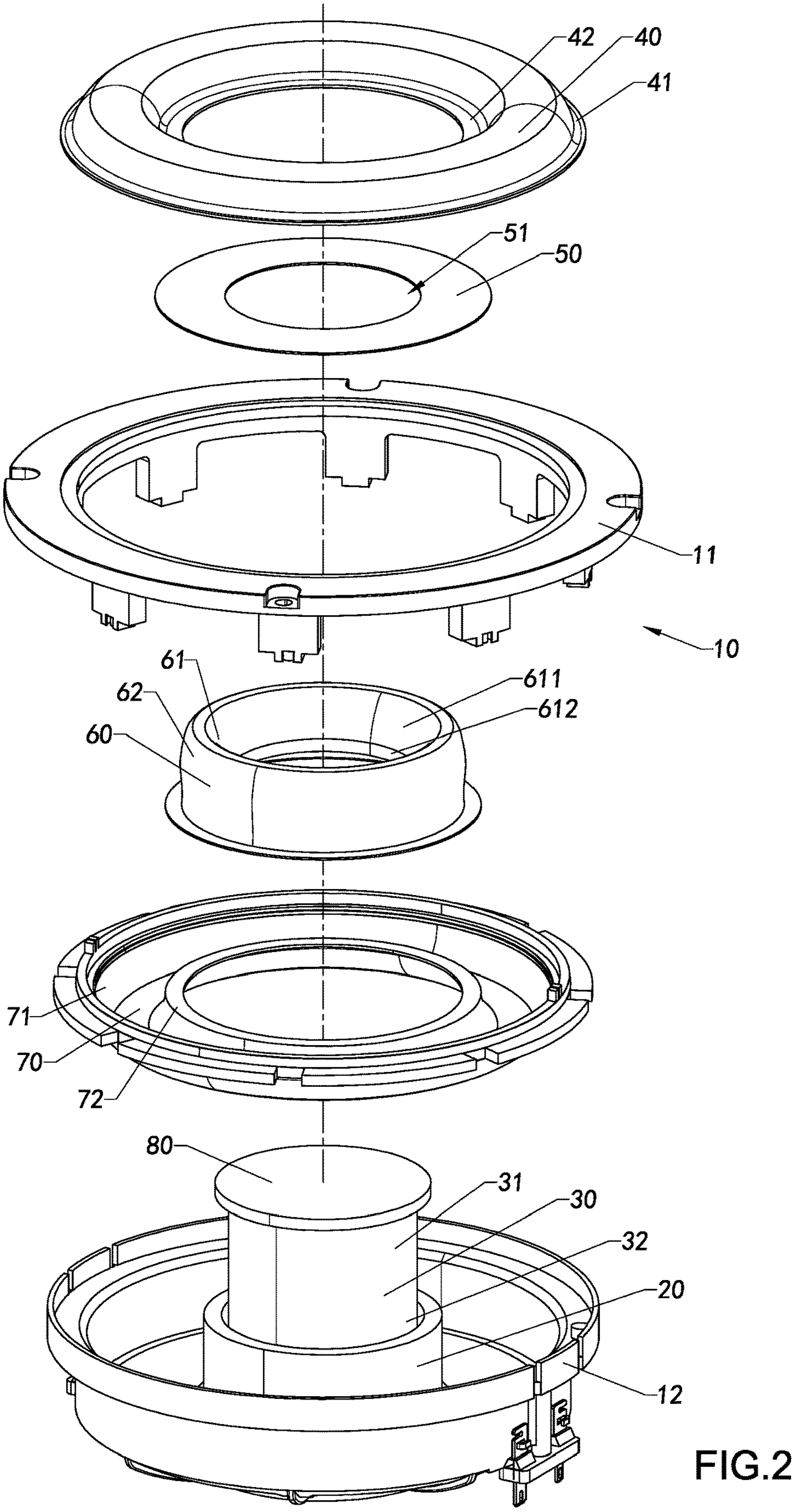
FIG. 2 is an exploded view of the loudspeaker according to the above preferred embodiment of the present invention.
Figure 3:
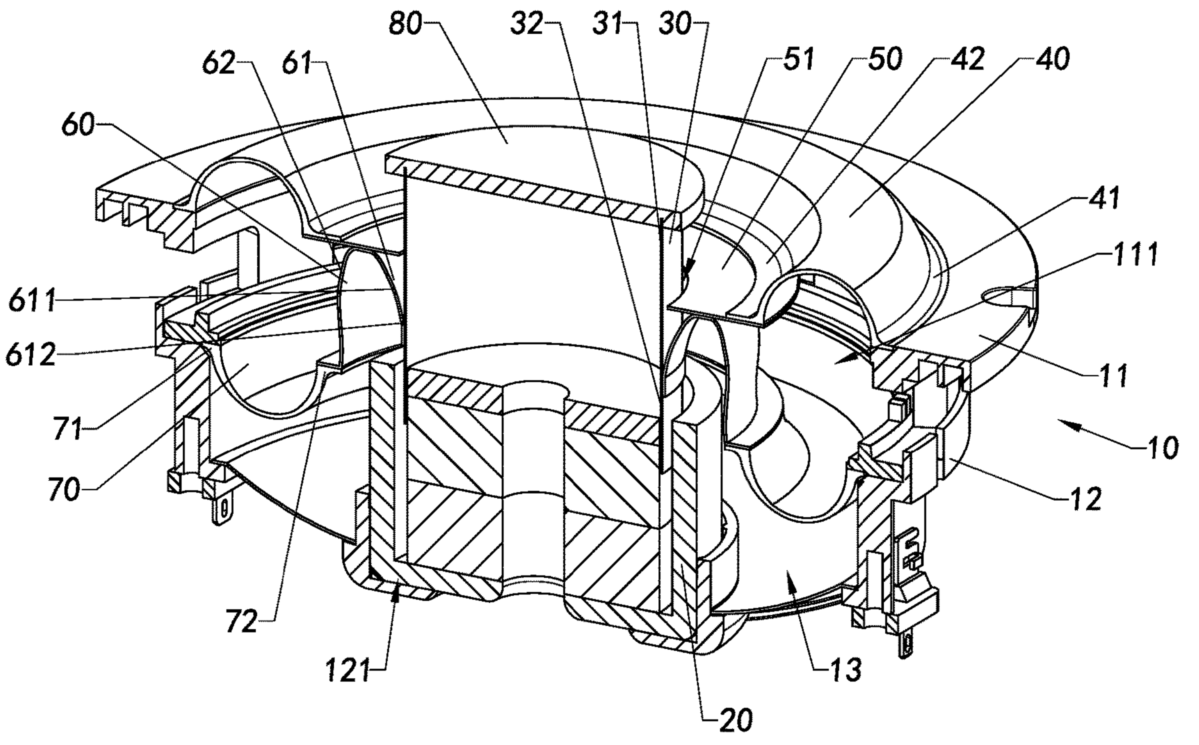
FIG. 3 is a sectional view of the loudspeaker according to the above preferred embodiment of the present invention.

Referring to FIGS. 1 to 3 of drawings, a loudspeaker according to a preferred embodiment of the present invention is disclosed and explained in the following description, wherein the loudspeaker comprises a frame 10, a magnetic loop system 20, a voice coil 30, a suspension edge 40, a vibrating diaphragm 50, a connecting member 60 and a limiting part 70.

In detail, the frame 10 comprises an upper frame 11 and a lower frame 12 and has a holding space 13, wherein the upper frame 11 is arranged on the lower frame 12, so as to form the holding space 13 of the frame 10 between the upper frame 11 and the lower frame 12. The upper frame 11 has a through hole 111, so that the upper frame 11 forms an annular shape, wherein the through hole 111 of the upper frame 11 communicates with the holding space 13. Preferably, the through hole 111 of the upper frame 11 is a central through hole, so that a central axis of the loudspeaker passes through the center of the through hole 111 of the upper frame 11.

It is worth mentioning that, in the loudspeakers according to the embodiments of the present invention, the installing method between the upper frame 11 and the lower frame 12 of the frame 10 is not limited. For example, the upper frame 11 may be provided with a plurality of inserting arms. Accordingly, the lower frame 12 may be provided with a plurality of inserting holes. Hence, the upper frame 11 and the lower frame 12 of the loudspeaker can be installed in such a manner that each of the inserting arms of the upper frame 11 is respectively inserted and held in the corresponding inserting holes of the lower frame 12. Alternatively, the lower frame 12 may be provided with a plurality of inserting arms. Accordingly, the upper frame 11 may be provided with a plurality of inserting holes. Hence, the upper frame 11 and the lower frame 12 of the loudspeaker can be installed in such a manner that each of the inserting arms of the lower frame 12 is respectively inserted and held in the corresponding inserting holes of the upper frame 11. Alternatively, according to other embodiments of the present invention, the upper frame 11 and the lower frame 12 can be mounted to each other by screwing. Alternatively, the upper frame 11 and the lower frame 12 can also be mounted to each other by means of glue bonding.

The magnetic loop system 20 is mounted to the lower frame 12 of the frame 10, and at least a part of the magnetic loop system 20 is held in the holding space 13 of the frame 10. Preferably, the central axis of the loudspeaker and a central axis of the magnetic loop system 20 coincide with each other. In detail, the lower frame 12 has a magnetic loop installation hole 121, wherein the magnetic loop installation hole 121 communicates with the holding space 13 of the frame 10, wherein the magnetic loop system 20 is installed to the magnetic loop mounting hole 121 of the lower frame 12. Preferably, the magnetic loop mounting hole 121 of the lower frame 12 is provided at the center of the lower frame 12. Hence, after the magnetic loop system 20 is installed to the magnetic loop mounting hole 121 of the lower frame 12, the central axis of the loudspeaker and the central axis of the magnetic loop system 20 coincide with each other.

Referring to FIG. 1 to FIG. 3, the voice coil 30 has a higher end portion 31 and a lower end portion 32 opposite to the higher end portion 31, wherein the lower end portion 32 of the voice coil 30 is coupled to the magnetic loop system 20 to allow the higher end portion 31 of the voice coil 30 to extend upward and away from the magnetic loop system 20, so that the lower end portion 32 of the voice coil 30 can be held in the holding space 13 of the frame 10. Preferably, the central axis of the loudspeaker and the central axis of the voice coil 30 coincide with each other. Based on the principle of electromagnetic induction, the magnetic loop system 20 can induce the voice coil 30 to reciprocate along the central axis of the loudspeaker in response to the input of an audio signal.

Referring to FIGS. 1 to 3, the suspension edge 40 has a suspension edge outer side 41 and a suspension edge inner side 42 opposite to the suspension edge outer side 41, wherein the suspension edge outer side 41 of the suspension edge 40 is extended outward, so as to be connected to the upper frame 11. The suspension edge inner side 42 of the suspension edge 40 is extended inward, so as to be connected to the vibrating diaphragm 50, so that the vibrating diaphragm 50 is able to be held in the through hole 111 of the upper frame 11 with the help of the suspension edge 40.

It is worth mentioning that the connection method in which the suspension edge outer side 41 of the suspension edge 40 is connected to the upper frame 11 and the connection method in which the suspension edge inner side 42 of the suspension edge 40 is connected to the vibrating diaphragm 50 are not limited in the loudspeakers according to the present invention. For example, in a loudspeaker according to a preferred embodiment of the present invention, after the suspension edge 40, the upper frame 11 and the vibrating diaphragm 50 are fabricated, the suspension edge outer side 41 of the suspension edge 40 is bonded to the upper frame 11 by a glue, and the suspension edge inner side 42 of the suspension edge 40 is bonded to the vibrating diaphragm 50, so as to keep the vibrating diaphragm 50 in the through hole 111 of the upper frame 11 in such a manner that the suspension edge 40 is retained between the vibrating diaphragm 50 and the upper frame 11.

In a loudspeaker according to another preferred embodiment of the present invention, the suspension edge outer side 41 of the suspension edge 40 is integrally combined with the upper frame 11, and the suspension edge inner side 42 is integrally combined with the upper frame 11. Hence, the suspension edge 40 is able to be held between the upper frame 11 and the vibrating diaphragm 50, so that the vibrating diaphragm 50 is held in the through hole 111 of the upper frame 11. In detail, after the upper frame 11 and the vibrating diaphragm 50 are fabricated, the upper frame 11 and the vibrating diaphragm 50 are placed in a suspension edge forming mold in such a manner that the vibrating diaphragm 50 is held in the through hole 111 of the upper frame 11. After the upper frame 11 and the vibrating diaphragm 50 are placed in the suspension edge forming mold, there is a gap between an inner wall of the upper frame 11 for forming the through hole 111 and an outer side of the vibrating diaphragm 50. A suspension edge forming material (such as, but not limited to silica gel, rubber) is injected into the suspension edge forming mold, so that the suspension edge forming material covers a part of the upper frame 11 and at least a part of the vibrating diaphragm 50. After the suspension edge forming material is cured, a demolding process is applied, so that the suspension edge 40 can be integrally formed between the upper frame 11 and the vibrating diaphragm 50, so that the suspension edge outer side 41 of the suspension edge 40 is integrally combined to the upper frame 11, and the suspension edge inner side 42 is integrally combined to the vibrating diaphragm 50.

Referring to FIGS. 1 to 3, according to this preferred embodiment of the present invention, a cross-sectional shape of the suspension edge 40 is "C" shape, and the suspension edge 40 is held between the upper frame 11 and the vibrating diaphragm 50 in such a manner that the suspension edge 40 is protruded outwardly. Alternatively, according to other embodiments of the present invention, the cross-sectional shape of the suspension edge 40 may be, but not limited to, a wave shape, and an "S" shape.

With continued reference to FIGS. 1 to 3, the connecting member 60 comprises a first connecting arm 61, wherein the first connecting arm 61 is provided to connect the vibrating diaphragm 50 and the voice coil 30, so that the magnetic loop system 20 drives the voice coil 30 to reciprocate along the central axis of the loudspeaker in response to the input of the audio signal, wherein with the help of the first connecting arm 61, the voice coil 30 is capable of driving the vibrating diaphragm 50 to reciprocate along the central axis of the loudspeaker, wherein the movement of the vibrating diaphragm 50 is synchronized with the movement of the voice coil 30. In other words, an upper side of the first connecting arm 61 is extended upwardly, so as to be capable of be connected to the vibrating diaphragm 50, and a lower side of the first connecting arm 61 is extended downward, so as to be capable of being connected to the voice coil 30. Hence, when the voice coil 30 is driven to reciprocate along the central axis of the loudspeaker, the voice coil 30 is capable of driving the vibrating diaphragm 50 to reciprocate synchronously along the central axis of the loudspeaker through the first connecting arm 61.

With continued reference to FIGS. 1 to 3, the limiting part 70 has a limiting outer side 71 and a limiting inner side 72 opposite to the limiting outer side 71, wherein the limiting outer side 71 of the limiting part 70 is extended outwardly, so as to be connected to the lower frame 12, wherein the limiting inner side 72 of the limiting part 70 is extended inward, so as to be connected to the connecting member 60, so that the limiting part 70 is held to surround the voice coil 30 with the help of the connecting member 60. In detail, the connecting member 60 further comprises a second connecting arm 62, wherein the second connecting arm 62 is configured to connect the vibrating diaphragm 50 and the limiting inner side 72 of the limiting part 70, so that the second connecting arm 62 of the connecting member 60 is capable of holding the limiting part 70 to surround the voice coil 30. In other words, an upper side of the second connecting arm 62 is extended upwardly, so as to be capable of being connected to the vibrating diaphragm 50, and a lower side of the second connecting arm 62 is extended downward, so as to be capable of being connected to the inner side 72 of the limiting part 70. Hence, when the vibrating diaphragm 50 reciprocates along the central axis of the loudspeaker, the limiting part 70 is capable of limiting the stroke of the vibrating diaphragm 50 through pulling or supporting the vibrating diaphragm 50 by the second connecting arm 62.

Preferably, the first connecting arm 61 and the second connecting arm 62 of the connecting member 60 are respectively connected to a same position of the vibrating diaphragm 50, referring to FIG. 3. For example, the first connecting arm 61 and the second connecting arm 62 of the connecting member 60 may be an integral structure, so that by connecting a middle portion of the connecting member 60 to the vibrating diaphragm 50, both the first connecting arm 61 and the second connecting arm 62 are connected to the same position of the vibrating diaphragm 50. In other words, the first connecting arm 61 and the second connecting arm 62 can be respectively extended from the same position of the vibrating diaphragm 50 to be respectively connected to the vibrating diaphragm 50 and the limiting inner side 72 of the limiting part 70.

Preferably, the first connecting arm 61 and the second connecting arm 62 of the connecting member 60 are symmetrical with each other. More preferably, referring to FIGS. 2 and 3, the first connecting arm 61 has an deviation arm portion 611 and a straight arm portion 612, wherein the deviation arm portion 611 of the first connecting arm 61 is connected to the vibrating diaphragm 50, and is extended from the vibrating diaphragm 50 to the voice coil 30, wherein the straight arm portion 612 is connected to the voice coil 30 in such a manner that the straight arm portion 612 is parallel to the voice coil 30, such as the straight arm portion 612 is capable of adjoining the voice coil 30. Hence, when the magnetic loop system 20 induces the voice coil 30 to reciprocate along the central axis of the loudspeaker in response to the input of the audio signal, it is capable of avoiding the interference between the first connecting arm 61 and the magnetic loop system 20, so as to avoid a noise during the sound production process of the loudspeaker. In addition, by making the straight arm portion 612 of the first connecting arm 61 adjoining the voice coil 30, the moving distance of the voice coil 30 is increased when the voice coil 30 is induced by the magnetic loop system 20 to reciprocate, so as to increase the stroke of the vibrating diaphragm 50, so as to help ensure the medium and low frequency sound effects of the loudspeaker.

It is worth mentioning that although in the loudspeaker shown in FIGS. 1 to 3, a cross-sectional edge line of the deviation arm portion 611 of the first connecting arm 61 has an arc shape, and a cross-sectional shape of the connecting member 60 is roughly "U" shape, but one skilled in the art should understand that the loudspeaker according to this preferred embodiment shown in FIG. 1 to FIG. 3 is only an example to disclose and explain the content and features of the loudspeaker of the present invention. According to other embodiments of the present invention, the edge line of the cross-section of the deviation arm portion 611 of the first connecting arm 61 is a straight line, so that the cross-section of the connecting member 60 is substantially "V" shaped.

Referring to FIGS. 1 to 3, in the loudspeaker according to this preferred embodiment of the present invention, the cross-sectional shape of the limiting part 70 is "C" shape, and the limiting part 70 is held between the lower frame 12 and the connecting member 60 in such a manner that the limiting part 70 is protruded outwardly. Alternatively, in the loudspeakers according to other embodiments of the present invention, the cross-sectional shape of the limiting part 70 may be, but not limited to, a wave shape, an "S" shape, and the like.

Preferably, the suspension edge 40 and the limiting part 70 of the loudspeaker can be made of a same material, such as a rubber material, so that the elasticity of the suspension edge 40 and the elasticity of the limiting part 70 can be the same, so as to ensure an even moving speed of the vibrating diaphragm 50 and to improve the sound quality of the loudspeaker.

It is worth mentioning that the connecting method between the connecting member 60 and the vibrating diaphragm 50 is not limited in the loudspeaker of the present invention. For example, in a loudspeaker according to a preferred embodiment of the present invention, the middle part of the member 60 is connected to the vibrating diaphragm 50 by a glue. In detail, the vibrating diaphragm 50 and the connecting member 60 are provided first, and then the middle part of the connecting member 60 is bonded to the vibrating diaphragm 50 by the glue. In a loudspeaker according to another preferred embodiment of the present invention, the vibrating diaphragm 50 is provided first, and the connecting member 60 is integrally formed with the vibrating diaphragm 50, and only the middle portion of the connecting member 60 is integrally combined with the vibrating diaphragm 50.

In addition, the first connecting arm 61 of the connecting member 60 can be glued to the voice coil 30, and the second connecting arm 62 of the connecting member 60 can be glued to the limiting inner side 72 of the limiting part 70. When the audio signal is provided and the magnetic loop system 20 is in response to operate, the magnetic loop system 20 is capable of inducing the voice coil 30 to reciprocate along the central axis of the loudspeaker, and the voice coil 30 is capable of driving the vibrating diaphragm 50 to reciprocate synchronously along the central axis of the loudspeaker with the help of the connecting member 60. In detail, when the magnetic loop system 20 induces the voice coil 30 to move upward along the central axis of the loudspeaker, the magnetic loop system 20 drives the vibrating diaphragm 50 to synchronously move upward along the central axis of the loudspeaker with the help of the first connecting arm 61. At the same time, the suspension edge 40 limits the upward stroke of the vibrating diaphragm 50 and ensures that the vibrating diaphragm 50 moves upward along the central axis of the loudspeaker, while the limiting part 70 pulls the vibrating diaphragm 50 downward through the second connecting arm 62 to limit the stroke of the vibrating diaphragm 50 and ensure that the vibrating diaphragm 50 moves upward along the central axis of the loudspeaker. Correspondingly, when the magnetic loop system 20 induces the voice coil 30 to move downward along the central axis of the loudspeaker, the magnetic loop system 20 drives the vibrating diaphragm 50 to synchronously move downward along the central axis of the loudspeaker with the help of the first connecting arm 61. At the same time, the suspension edge 40 limits the downward stroke of the vibrating diaphragm 50 and ensures that the vibrating diaphragm 50 moves downward along the central axis of the loudspeaker. At the same time, the limiting part 70 upwardly supports the vibrating diaphragm 50 with the help of the second connecting arm 62, so as to limit the stroke of the vibrating diaphragm 50 and ensure that the vibrating diaphragm 50 moves downward along the central axis of the loudspeaker.

With continued reference to FIGS. 1 to 3, the vibrating diaphragm 50 has a central hole 51, so that the vibrating diaphragm 50 has an annular shape, and the higher end portion 31 of the voice coil 30 can pass through the central hole 51 of the vibrating diaphragm 50, so that the voice coil 30 is held in the central hole 51 of the vibrating diaphragm 50. Preferably, the loudspeaker further comprises a dust cover 80, wherein the dust cover 80 is provided to the higher end portion 31 of the voice coil 30 to seal the voice coil 30. Alternatively, in the loudspeakers according to other embodiments of the present invention, the vibrating diaphragm 50 is not provided with the central hole 51.

Figure 4:
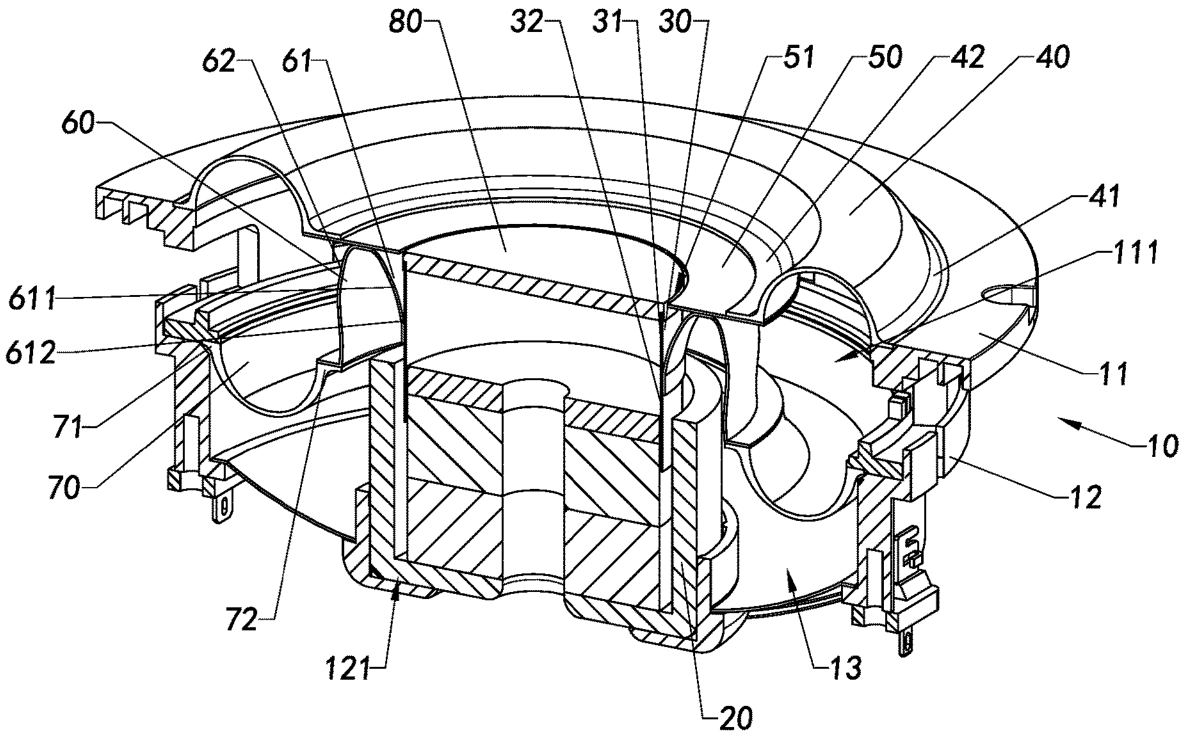
FIG. 4 is a sectional view of a loudspeaker according to an alternative mode of the above preferred embodiment of the present invention.

FIG. 4 shows a modified embodiment of the loudspeaker. What is different from the loudspeaker shown in FIGS. 1 to 3 is that, in the loudspeaker shown in FIG. 4, the higher end portion 31 of the voice coil 30 is lower than the vibrating diaphragm 50, so that an outer surface of the dust cover 80 mounted to the higher end portion 31 of the voice coil 30 is coplanar with an outer surface of the vibrating diaphragm 50. Alternatively, the outer surface of the dust cover 80 may be higher than the outer surface of the vibrating diaphragm 50, or the outer surface of the dust cover 80 may be lower than the outer surface of the vibrating diaphragm 50.

Figure 5:
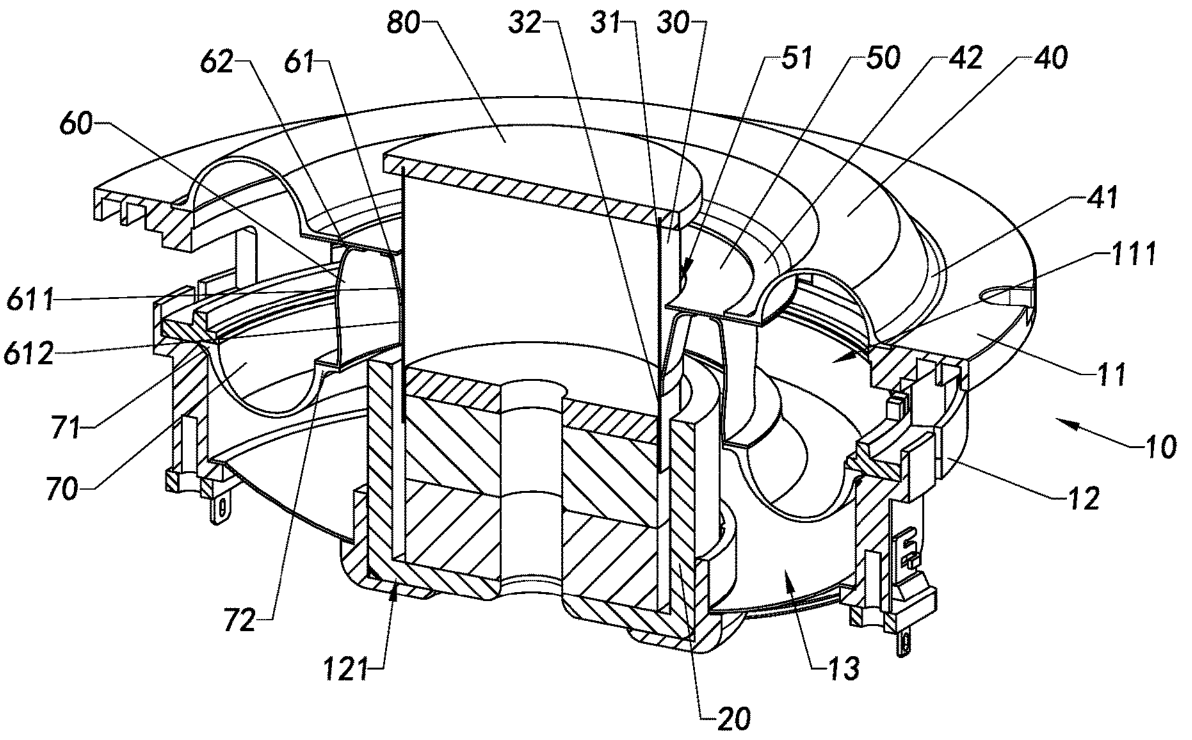
FIG. 5 is another sectional view of a loudspeaker according to another alternative mode of the above preferred embodiment of the present invention.

FIG. 5 shows another modified embodiment of the loudspeaker. What is different from the loudspeaker shown in FIGS. 1 to 3 is that, in the loudspeaker shown in FIG. 5, the first connecting arm 61 and the second connecting arm 62 are separate structures, so that the first connecting arm 61 and the second connecting arm 62 are respectively connected to the vibrating diaphragm 50 at different positions. In detail, the upper side of the first connecting arm 61 is extended upward, so as to be connected to the inner side of the vibrating diaphragm 50, and the lower side of the first connecting arm 61 is extended downward, so as to be connected to the voice coil 30. Correspondingly, the upper side of the second connecting arm 62 is extended upward, so as to be connected to the outer side of the vibrating diaphragm 50, and the lower side of the second connecting arm 62 is extended downward, so as to be connected to the limiting inner side 72 of the limiting part 70.

According to one aspect of the present invention, the present invention provides a method for manufacturing the loudspeaker, wherein the manufacturing method comprises the following steps:

(a) allowing the suspension edge outer side 41 and the suspension edge inner side 42 of the suspension edge 40 be respectively connected to upper frame 11 and the vibrating diaphragm 50;

(b) connecting the connecting member 60 to the limiting inner side 72 of the limiting part 70 and the vibrating diaphragm 50;

(c) installing the magnetic loop system 20 to the lower frame 12; and (d) installing the limiting outer side 71 of the limiting part 70 to the lower frame 12 in such a manner that the lower end portion 32 of the voice coil 30 for driving the vibrating diaphragm 50 is coupled to the magnetic loop system 20, and mounting the upper frame 11 with the lower frame 12, so as to obtain the loudspeaker.

Preferably, in the above method, the connecting member 60 is connected to the voice coil 30 to allow the voice coil 30 to drive the vibrating diaphragm 50 with the help of the connecting member 60. In detail, the upper side of the first connecting arm 61 of the connecting member 60 is allowed to be extended upward, so as to be connected to the vibrating diaphragm 50, and the lower side of the first connecting arm 61 is allowed to be extended downward, so as to be connected to the vibrating diaphragm 50. The voice coil 30 can thus be allowed to drive the vibrating diaphragm 50 with the help of the connecting member 60. It can be understood that, in the step (b), the upper side of the second connecting arm 62 of the connecting member 60 is allowed to be extended upward, so as to be connected to the vibrating diaphragm 50, and the lower side of the second connecting arm 62 is allowed to be extended downward, so as to be connected to the limiting inner side 72 of the limiting part 70. More preferably, the upper side of the first connecting arm 61 and the upper side of the second connecting arm 62 are respectively connected to the vibrating diaphragm 50 at a same position of the vibrating diaphragm 50.

According to a preferred embodiment of the present invention, the step (b) further comprises the following steps: bonding the middle part of the connecting member 60 to the vibrating diaphragm 50; and bonding two end portions of the connecting member 60 to the voice coil 30 and the inner side 72 of the limiting part 70 respectively.

According to another preferred embodiment of the present invention, the step (b) further comprises the following steps: integrally forming the connecting member 60 on the vibrating diaphragm 50 in such a manner that the middle part of the connecting member 60 being bonded to the vibrating diaphragm 50; and bonding two end portions of the connecting member 60 to the voice coil 30 and the inner side 72 of the limiting part 70 respectively.

According to another aspect of the present invention, the present invention further provides a sounding method of the loudspeaker, wherein the sound production method comprises the following steps:

(A) driving the voice coil 30 to reciprocate along the central axis of the loudspeaker when the magnetic loop system 20 is responsive to the input of an audio signal; and (B) when the voice coil 30 drives the vibrating diaphragm 50 to reciprocate synchronously along the central axis of the loudspeaker, the vibrating diaphragm 50 drives the suspension edge 40 to move and drives the limiting part 70 to move with the help of the connecting member 60, so as to allow the suspension edge 40 and the limiting part 70 to reciprocate and deform along the central axis of the loudspeaker synchronously and with the same amplitude. Preferably, the suspending edge 40 and the limiting part 70 are made of a same material, such as a rubber material, so that the elasticities of the suspending edge 40 and the limiting part 70 can be the same, so that it is beneficial to ensure the even moving speed of the vibrating diaphragm 50, so as to improve the sound quality of the loudspeaker.

Figure 6:
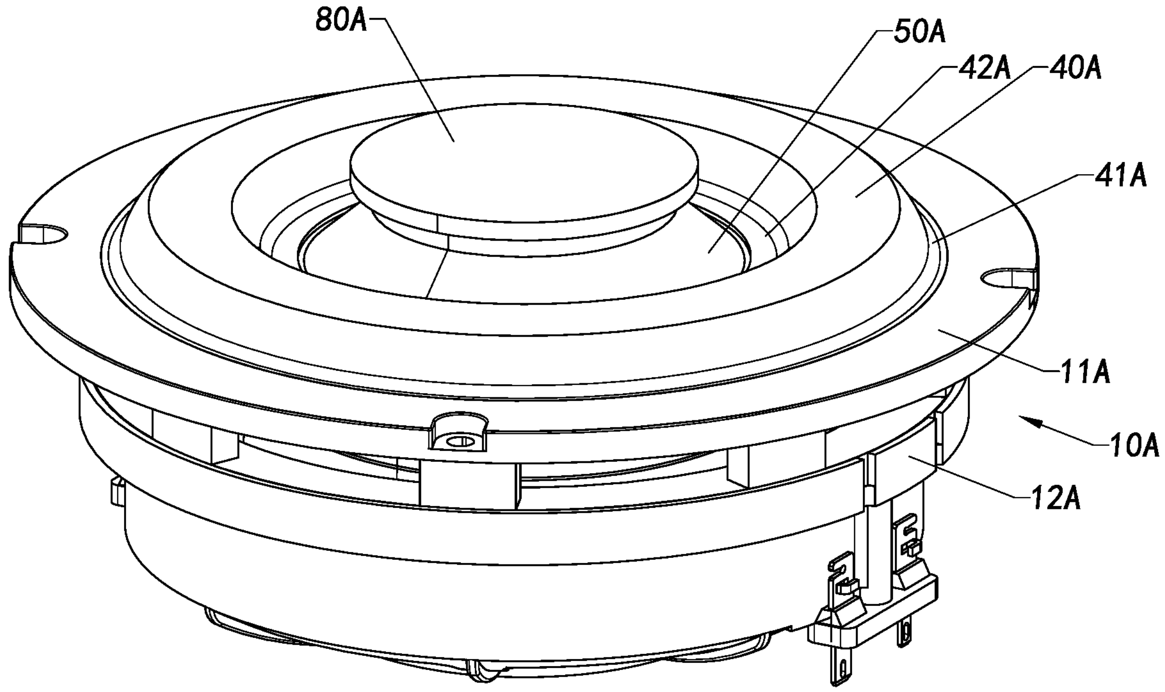
FIG. 6 is a perspective view of a loudspeaker according to another preferred embodiment of the present invention.
Figure 7:
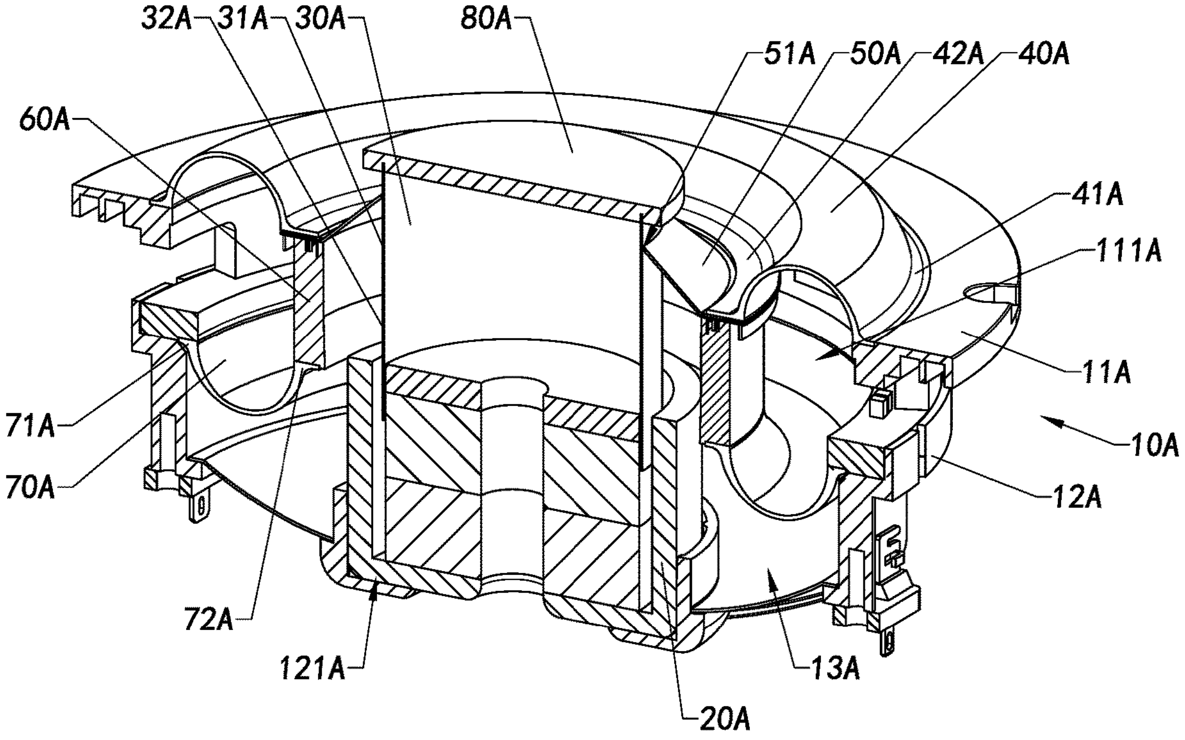
FIG. 7 is a sectional view of the loudspeaker according to the above another preferred embodiment of the present invention.

Referring to FIG. 6 and FIG. 7 of the drawings, a loudspeaker according to another preferred embodiment of the present invention is disclosed and explained in the following description, wherein the loudspeaker comprises a frame 10A, a magnetic loop system 20A, a voice coil 30A, a suspension edge 40A, a vibrating diaphragm 50A, a connecting member 60A and a limiting part 70A.

In detail, the frame 10A comprises an upper frame 11A and a lower frame 12A and has a holding space 13A, wherein the upper frame 11A is arranged to the lower frame 12A, so as to form the holding space 13A of the frame 10A between the upper frame 11A and the lower frame 12A. The upper frame 11A has a through hole 111A, so that the upper frame 11A forms an annular shape, wherein the through hole 111A of the upper frame 11A communicates with the holding space 13A. Preferably, the through hole 111A of the upper frame 11A is a central through hole, so that a central axis of the loudspeaker passes through the center of the through hole 111A of the upper frame 11A.

It is worth mentioning that, in the loudspeakers according to the embodiments of the present invention, the installing method of the upper frame 11A and the lower frame 12A of the frame 10A is not limited. For example, the upper frame 11A may be provided with a plurality of inserting arms. Accordingly, the lower frame 12A may be provided with a plurality of inserting holes. Hence, the upper frame 11A and the lower frame 12A of the loudspeaker can be installed in such a manner that each of the inserting arms of the upper frame 11A is respectively inserted and held in the corresponding inserting holes of the lower frame 12A. Alternatively, the lower frame 12A may be provided with a plurality of inserting arms. Accordingly, the upper frame 11A may be provided with a plurality of inserting holes. Hence, the upper frame 11A and the lower frame 12A of the loudspeaker can be installed in such a manner that each of the inserting arms of the lower frame 12A is respectively inserted and held in the corresponding inserting holes of the upper frame 11A. Alternatively, according to other embodiments of the present invention, the upper frame 11A and the lower frame 12A can be mounted to each other by screwing. Alternatively, the upper frame 11A and the lower frame 12A can also be mounted to each other by means of glue bonding.

The magnetic loop system 20A is mounted to the lower frame 12A of the frame 10A, and the magnetic loop system 20A is held in the holding space 13A of the frame 10A. Preferably, the central axis of the loudspeaker and a central axis of the magnetic loop system 20A coincide with each other. In detail, the lower frame 12A has a magnetic loop installation hole 121, wherein the magnetic loop installation hole 121 communicates with the holding space 13A of the frame 10A, wherein the magnetic loop system 20A is installed to the magnetic loop mounting hole 121A of the lower frame 12A. Preferably, the magnetic loop mounting hole 121A of the lower frame 12A is provided at the center of the lower frame 12A. Hence, after the magnetic loop system 20A is installed to the magnetic loop mounting hole 121A of the lower frame 12A, the central axis of the loudspeaker and the central axis of the magnetic loop system 20A coincide with each other.

Figure 8:
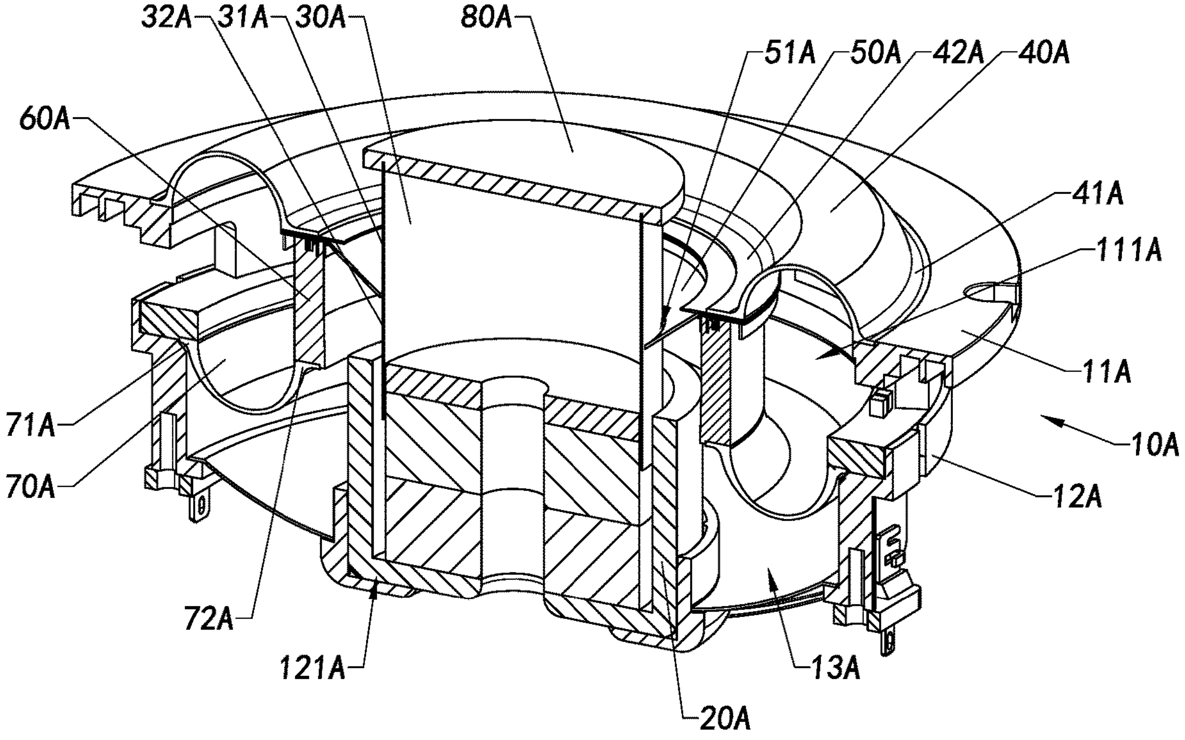
FIG. 8 is a sectional view of a loudspeaker according to an alternative mode of the above another preferred embodiment of the present invention.

Referring to FIG. 5 to FIG. 6, the voice coil 30A has a higher end portion 31A and a lower end portion 32A opposite to the higher end portion 31A, wherein the lower end portion 32A of the voice coil 30A is coupled to the magnetic loop system 20A to allow the higher end portion 31A of the voice coil 30A to be extended upward and away from the magnetic loop system 20A, so that the lower end portion 32A of the voice coil 30A can be held in the holding space 13A of the frame 10A, and the higher end portion 31AA of the voice coil 30A is connected to the vibrating diaphragm 50A. Preferably, the central axis of the loudspeaker and the central axis of the voice coil 30A coincide with each other. Based on the principle of electromagnetic induction, the magnetic loop system 20A can induce the voice coil 30A to reciprocate along the central axis of the loudspeaker in response to the input of an audio signal, so as to drive the diaphragm 50A to reciprocate synchronously along the central axis of the speaker. Preferably, in the loudspeaker according to the preferred embodiment shown in FIGS. 6 and 7, the vibrating diaphragm 50A is inclinedly and upwardly extended from the suspension edge 40A to the voice coil 30A. Alternatively, referring to the loudspeaker according to a modified embodiment as shown in FIG. 8, the vibrating diaphragm 50A is incllinedly and downwardly extended from the suspension edge 40A to the voice coil 30A.

Referring to FIGS. 6 and 7, the suspension edge 40A has a suspension edge outer side 41A and a suspension edge inner side 42A opposite to the suspension edge outer side 41A, wherein the suspension edge outer side 41A of the suspension edge 40A is extended outward, so as to be connected to the upper frame 11A. The suspension edge inner side 42A of the suspension edge 40A is extended inward, so as to be connected to the vibrating diaphragm 50A, so that the vibrating diaphragm 50A can be connected to the suspension edge 40A, so that the vibrating diaphragm 50A is able to be held in the through hole 111A of the upper frame 11A with the help of the suspension edge 40A.

It is worth mentioning that the connection method in which the outer side 41A of the suspension edge 40A is connected to the upper frame 11A and the connection method in which the suspension edge inner side 42A of the suspension edge is connected to the vibrating diaphragm 50A are not limited in the loudspeakers according to the present invention. For example, referring to a loudspeaker according to a preferred embodiment of the present invention, after the suspension edge 40A, the upper frame 11A and the vibrating diaphragm 50A are fabricated, the suspension edge outer side 41A of the suspension edge 40A is bonded to the upper frame 11A by a glue, and the suspension edge inner side 42A of the suspension edge 40A is bonded to the vibrating diaphragm 50A, so as to keep the vibrating diaphragm 50A in the through hole 111A of the upper frame 11A in such a manner that the suspension edge 40A is retained between the vibrating diaphragm 50A and the upper frame 11A.

Referring to a loudspeaker according to another preferred embodiment of the present invention, the suspension edge outer side 41A of the suspension edge 40A is integrally combined with the upper frame 11A, and the suspension edge inner side 42A is integrally combined with the upper frame 11A. Hence, the suspension edge 40A is able to be held between the upper frame 11A and the vibrating diaphragm 50A. In detail, after the upper frame 11A and the vibrating diaphragm 50A are fabricated, the upper frame 11A and the vibrating diaphragm 50A are placed in a suspension edge forming mold in such a manner that the vibrating diaphragm 50A is held in the through hole 111A of the upper frame 11A. A suspension edge forming material (such as, but not limited to silica gel, rubber) is injected into the suspension edge forming mold, and after the suspension edge forming material is cured, a demolding process is applied, so that the suspension edge 40A can be integrally formed between the upper frame 11A and the vibrating diaphragm 50A, so that the suspension edge outer side 41A of the suspension edge 40A is integrally combined to the upper frame 11A, and the suspension edge inner side 42A is integrally combined to the vibrating diaphragm 50A.

Referring to FIGS. 6 and 7, according to this preferred embodiment of the present invention, the cross-sectional shape of the suspension edge 40A has a "C" shape, and the suspension edge 40A is held between the upper frame 11A and the vibrating diaphragm 50A in such a manner that the suspension edge 40A is protruded outwardly. Alternatively, according to other embodiments of the present invention, the cross-sectional shape of the suspension edge 40A may be, but not limited to, a wave shape, an "S" shape.

With continued reference to FIGS. 6 and 7, the limiting part 70A has a limiting outer side 71A and a limiting inner side 72A opposite to the limiting outer side 71A, wherein the limiting outer side 71A of the limiting part 70A is extended outward, so as to be connected to the lower frame 12A, wherein the limiting inner side 72A of the limiting part 70A is extended inward, so as to be connected to the connecting member 60A, wherein the connecting member 60A is connected to the vibrating diaphragm 50A to keep the limiting part 70A surrounding the voice coil 30A with the help of the connecting member 60A. In other words, the upper side of the connecting member 60A is extended upward to be connected to the vibrating diaphragm 50A, and the lower side of the connecting member 60A is extended downward to be connected to the limiting inner side 72A of the limiting part 70A.

It is worth mentioning that the connecting method between the connecting member 60A and the vibrating diaphragm 50A is not limited. For example, the connecting member 60A and the vibrating diaphragm 50A can be connected with each other by glue bonding, or the connecting member 60A can be integrally extended from the vibrating diaphragm 50A to the limiting inner side 72A of the limiting part 70A. Correspondingly, the connecting manner between the connecting member 60A and the limiting inner side 72A of the limiting part 70A is not limited. For example, the connecting member 60A and the limiting inner side 72A of the limiting part 70A can be connected with each other by means of glue bonding, or the connecting member 60A can be integrally extended from the limiting inner side 72A of the positioning portion 70A to the vibrating diaphragm 50A.

When an audio signal is provided and the magnetic loop system 20A is in response to operate, the magnetic loop system 20A is capable of inducing the voice coil 30A to reciprocate along the central axis of the loudspeaker, and the voice coil 30A is capable of driving the vibrating diaphragm 50A to reciprocate synchronously along the central axis of the loudspeaker. In detail, when the magnetic loop system 20A induces the voice coil 30A to move upward along the central axis of the loudspeaker and drives the vibrating diaphragm 50A to reciprocate synchronously along the central axis of the loudspeaker, the suspension edge 40A limits the upward stroke of the vibrating diaphragm 50A and ensures that the vibrating diaphragm 50A moves upward along the central axis of the loudspeaker, while the limiting part 70A pulls the vibrating diaphragm 50A downward through the connecting member 60A to limit the stroke of the vibrating diaphragm 50A and ensure that the vibrating diaphragm 50A moves upward along the central axis of the loudspeaker. Correspondingly, when the magnetic loop system 20A induces the voice coil 30A to move downward along the central axis of the loudspeaker, the suspension edge 40A limits the downward stroke of the vibrating diaphragm 50A and ensures that the vibrating diaphragm 50A moves downward along the central axis of the loudspeaker. At the same time, the limiting part 70A upwardly supports the vibrating diaphragm 50A with the help of the connecting member 60A, so as to limit the stroke of the vibrating diaphragm 50A and ensure that the vibrating diaphragm 50A moves downward along the central axis of the loudspeaker.

With continued reference to FIGS. 6 and 7, the vibrating diaphragm 50A has a central hole 51A, so that the vibrating diaphragm 50A is annular, and the higher end portion 31A of the voice coil 30A can pass through the central hole 51A of the vibrating diaphragm 50A, so that the voice coil 30A is held in the central hole 51A of the vibrating diaphragm 50A. Preferably, the loudspeaker further comprises a dust cover 80A, wherein the dust cover 80A is provided to the higher end portion 31A of the voice coil 30A to seal the voice coil 30A. Alternatively, in the loudspeakers according to other embodiments of the present invention, the vibrating diaphragm 50A is not provided with the central hole 51A.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention comprises all modifications encompassed within the spirit and scope of the following claims.

What is claimed is:

1. A loudspeaker, comprising:

a vibrating diaphragm, which has an annular shape, having an outer edge and an inner edge, and defining a central hole within said inner edge;

a frame;

a connecting member;

a magnetic loop system provided on said frame;

a voice coil coupled to said magnetic loop system, wherein said voice coil comprises a higher end portion which is allowed to pass through said central hole of said vibrating diaphragm, wherein said vibrating diaphragm is connected to said voice coil by said connecting member, wherein said voice coil passes through said central hole of said vibrating diaphragm;

a suspension edge having an outer side connected to said frame and an inner side connected to said outer edge of said vibrating diaphragm respectively; and a limiting part having a limiting outer side and a limiting inner side opposite to the limiting outer side, said limiting outer side of said limiting part is installed to said frame, and said limiting inner side is extending toward said voice coil, wherein said connecting member is provided to connect said vibrating diaphragm with said limiting inner side of said limiting part, wherein said connecting member comprises a first connecting arm and a second connecting arm, wherein said first connecting arm and said second connecting arm are symmetrical with each other;

wherein when said voice coil is induced and moved in a reciprocating manner by said magnetic loop system, said vibrating diaphragm is driven to move by said first connecting arm in response to said voice coil, such that said vibrating diaphragm is synchronously moved with respect to said voice coil via said connecting member;

wherein when said voice coil is induced and upwardly moved by said magnetic loop system, said first connecting arm is driven by said voice coil to upwardly push said vibrating diaphragm to synchronously move with respect to said voice coil, wherein at the same time, said limiting part pulls said vibrating diaphragm downward via said second connecting arm to limit a stroke of said vibrating diaphragm so as to ensure said vibrating diaphragm moving upward;

wherein when said voice coil is induced and downwardly moved by said magnetic loop system, said first connecting arm is driven by said voice coil to downwardly pull said vibrating diaphragm to synchronously move with respect to said voice coil, wherein at the same time, said limiting part upwardly supports said vibrating diaphragm via said second connecting arm to limit the stroke of said vibrating diaphragm so as to ensure said vibrating diaphragm moving downward.

2. The loudspeaker, as recited in claim 1, further comprising a dust cover coupled at said higher end portion of said voice coil, wherein said suspension edge and said limiting part are made of a same material, wherein when said voice coil is induced and downwardly moved by said magnetic loop system, said dust cover is coplanar with an outer surface of said vibrating diaphragm.

3. The loudspeaker, as recited in claim 1, wherein said first connecting arm and said second connecting arm are connected to a same position of said vibrating diaphragm.

4. The loudspeaker, as recited in claim 3, wherein said first connecting arm and said second connecting arm have an integral structure.

5. The loudspeaker, as recited in claim 4, wherein said first connecting arm portion has a deviation arm portion and a straight arm portion, wherein said deviation arm portion extends from said vibrating diaphragm to said voice coil, wherein said straight arm portion is connected to said voice coil.

6. The loudspeaker, as recited in claim 5, wherein a cross-sectional edge line of said deviation arm portion is one of a curve line and a straight line, wherein said straight arm portion is attached to said voice coil.

7. The loudspeaker, as recited in claim 4, wherein a cross-sectional shape of said connecting member is one of "U" shape and "V" shape.

8. The loudspeaker, as recited in claim 1, wherein said first connecting arm and said second connecting arm are separated structures to form two individual elements, wherein said first connecting arm is connected to said vibrating diaphragm on an inner side of said vibrating diaphragm, wherein said second connecting arm is connected to said vibrating diaphragm on an outer side of said vibrating diaphragm, such that said first connecting arm and said second connecting arm are connected to different positions of said vibrating diaphragm.

9. The loudspeaker, as recited in claim 1, wherein said suspension edge is arranged between said frame and said vibrating diaphragm in a manner of protruding outward, wherein said limiting part is arranged between said frame and said connecting member in a manner of protruding outward, wherein protruding directions of said suspension edge and said limiting part are opposite, wherein said higher end portion of said voice coil is coplanar with said vibrating diaphragm.

10. A manufacturing method for manufacturing a loudspeaker, comprising the following steps:

(a) allowing a suspension edge outer side and a suspension edge inner side of a suspension edge be respectively connected to an upper frame and a vibrating diaphragm;

(b) connecting a connecting member to a limiting inner side of a limiting part and said vibrating diaphragm, wherein said connecting member comprises a first connecting arm and a second connecting arm configured as separated structures to form two individual elements, wherein said first connecting arm and said second connecting arm are symmetrical with each other;

(c) installing a magnetic loop system to a lower frame; and (d) coupling a voice coil to said magnetic loop system and connecting said vibrating diaphragm to said voice coil by said connecting member, wherein said voice coil is disposed within a central hole of said vibrating diaphragm, wherein when said voice coil is induced and moved in a reciprocating manner by said magnetic loop system, said vibrating diaphragm is driven to move by said first connecting arm in response to said voice coil, such that said vibrating diaphragm is synchronously moved with respect to said voice coil via said connecting member;

(e) installing a limiting outer side of said limiting part to said lower frame in such a manner that a lower end portion of the voice coil for driving said vibrating diaphragm is coupled to said magnetic loop system, and mounting said upper frame with said lower frame, so as to obtain said loudspeaker, wherein said voice coil comprises a higher end portion which is allowed to pass through a central hole of said vibrating diaphragm, wherein said connecting member is connected to said voice coil, so as to allow said voice coil to drive said vibrating diaphragm though said connecting member, and (f) coupling a dust cover at said higher end portion of said voice coil, when said voice coil is induced and downwardly moved by said magnetic loop system, said dust cover is coplanar with an outer surface of said vibrating diaphragm;

wherein said step (b) comprises the following steps:

connecting said first connecting arm to said vibrating diaphragm on an inner side of said vibrating diaphragm; and connecting said second connecting arm to said vibrating diaphragm on an outer side of said vibrating diaphragm, such that said first connecting arm and said second connecting arm are connected to different positions of said vibrating diaphragm.

11. A manufacturing method for manufacturing a loudspeaker, comprising the following steps:

(a) allowing a suspension edge outer side and a suspension edge inner side of a suspension edge be respectively connected to an upper frame and a vibrating diaphragm;

(b) connecting a connecting member to a limiting inner side of a limiting part and said vibrating diaphragm, wherein said connecting member comprises a first connecting arm and a second connecting arm integrally extended from said first connecting arm to have an integral structure, wherein said first connecting arm and said second connecting arm are symmetrical with each other;

(c) installing a magnetic loop system to a lower frame; and (d) coupling a voice coil to said magnetic loop system and connecting said vibrating diaphragm to said voice coil by said connecting member, wherein said voice coil is disposed within a central hole of said vibrating diaphragm, wherein when said voice coil is induced and moved in a reciprocating manner by said magnetic loop system, said vibrating diaphragm is driven to move by said first connecting arm in response to said voice coil, such that said vibrating diaphragm is synchronously moved with respect to said voice coil via said connecting member;

(e) installing a limiting outer side of said limiting part to said lower frame in such a manner that a lower end portion of the voice coil for driving said vibrating diaphragm is coupled to said magnetic loop system, and mounting said upper frame with said lower frame, so as to obtain said loudspeaker, wherein said voice coil comprises a higher end portion which is allowed to pass through a central hole of said vibrating diaphragm, wherein said connecting member is connected to said voice coil, so as to allow said voice coil to drive said vibrating diaphragm though said connecting member, and (f) coupling a dust cover at said higher end portion of said voice coil, when said voice coil is induced and downwardly moved by said magnetic loop system, said dust cover is coplanar with an outer surface of said vibrating diaphragm;

wherein said step (b) comprises the following steps: integrally forming said connecting member on said vibrating diaphragm in such a manner that a middle portion of said connecting member is connected to said vibrating diaphragm, such that said first connecting arm and said second connecting arm are connected to a same position of said vibrating diaphragm; and respectively bonding two end portions of said connecting member to said voice coil and said limiting inner side of said limiting part.

* * * * *